A. CAMPBELL.
Self-Regulating Pressure Valve.
No. 6,264. Reissued Feb. 2, 1875.
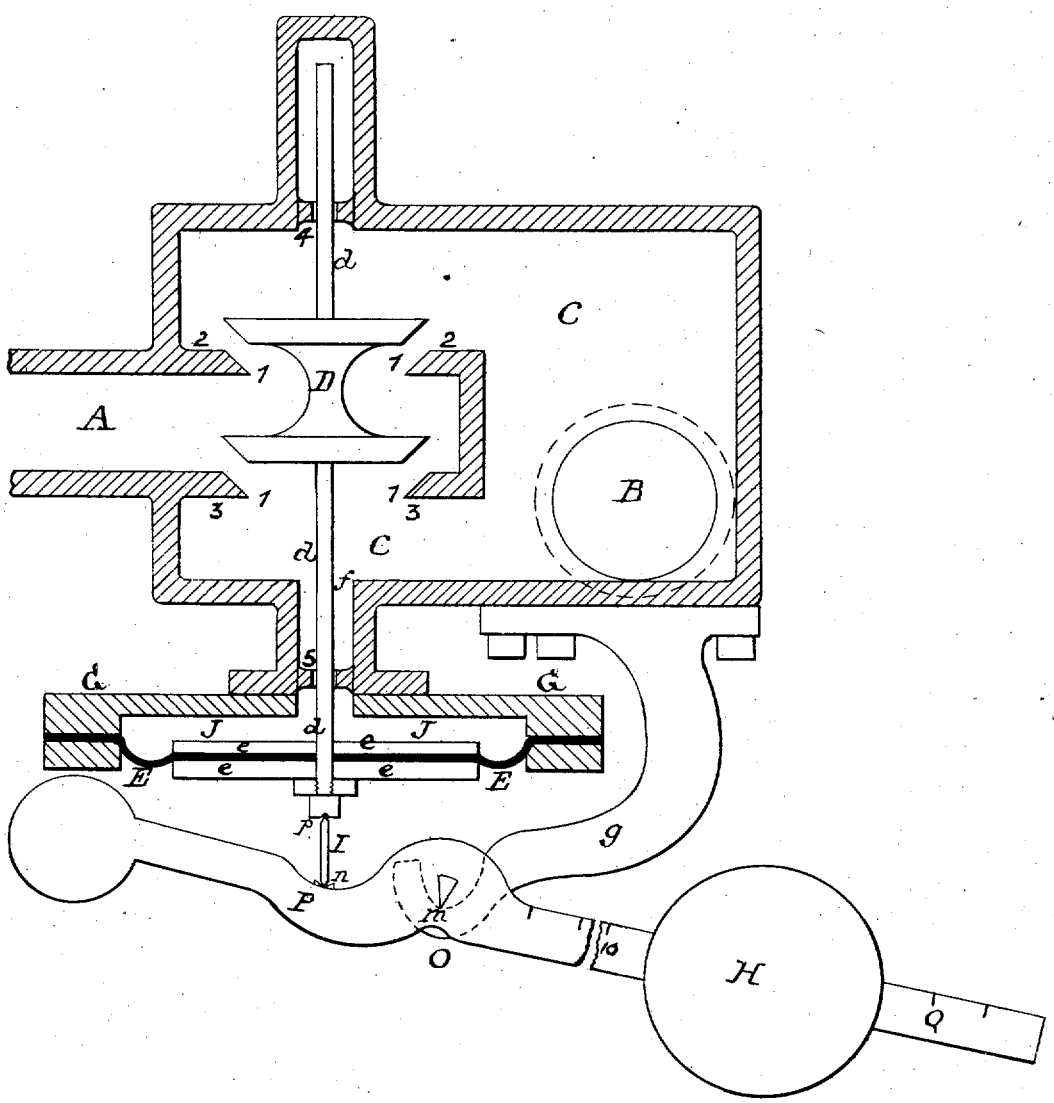
WITNESSES.
Louis Campbell
A. W. Marshall
INVENTOR.
Augustus Campbell
THE GRAPHIC CO. PHOTO-LITH. 39 & 41 PARK PLACE, N.Y.

UNITED STATES PATENT OFFICE.

AUGUSTINE CAMPBELL, OF METUCHEN, NEW JERSEY, ASSIGNOR TO NATHANIEL C. LOCKE, OF SALEM, MASSACHUSETTS.

IMPROVEMENT IN SELF-REGULATING PRESSURE-VALVES.

Specification forming part of Letters Patent No. 43,833, dated August 16, 1864; antedated September 22, 1862; reissue No. 6,264, dated February 2, 1875; application filed December 9, 1874.

*To all whom it may concern:*

Be it known that I, AUGUSTINE CAMPBELL, formerly of Brooklyn, Kings county, State of New York, but now of Metuchen, Middlesex county, State of New Jersey, have invented a Steam-Pressure Regulator, of which the following is a specification:

This invention relates to apparatuses constructed to be connected with, and interposed between, two vessels or chambers—as, for instance, a steam-boiler and a drying-machine—for the purpose of obtaining in the drying-cylinder a reduced pressure from that in the boiler, and also for the purpose of maintaining such reduced pressure always at a uniform degree of pressure in the boiler.

The apparatus embraced by this invention acts in a manner more or less analogous to others heretofore employed, but differs therefrom in its construction and the effects produced, all of which will fully appear in the detail description thereof hereinafter given.

In the accompanying plate of drawings my improved apparatus for regulating the pressure of steam, &c., is illustrated, the figure being substantially a central vertical section of the same.

In the drawings, A represents the pipe by which the steam enters the pressure-regulator from the boiler, and B the pipe by which the steam passes from the regulator to the drying-cylinder, and this pipe B enters the regulator at right angles to the entrance of pipe A; C, the steam-chamber of the regulator, and *c* a case located within the chamber C. The case *c* has a similar opening, 1, in both its upper and lower sides, 2 and 3. These openings communicate with the steam-entrance pipe A and the steam-chamber, and they are in the same vertical plane, and, furthermore, they are both similarly adapted for the seating of a balanced puppet-valve, D, which is mounted on, and carried by, a vertical stem, *d*. The valve-stem *d* extends both above and below the valve D, and by its upper portion plays loosely, and without sensible friction, through a fixed guide, 4, of the chamber C, and its lower portion also plays similarly through a fixed guide, 5, at the lower end of the neck *f*, which neck, at its upper end, opens to the steam-chamber C, and at its lower end makes communication with a flexible diaphragm, E. The central part of the diaphragm E is confined between two similar disks, *e e*, which are fixed to the lower end of valve-stem *d*, and the rim of the diaphragm is confined between the two rings F and G, one, G, of which rings is substantially a continuation of the lower end of the neck *f*, and the other, F, is a ring, which, with the diaphragm-rim first interposed between it and the ring G, is secured to the ring G, the whole leaving a clear space or chamber, J, between the lower end of the neck *f* and the central portion of the diaphragm, all as represented. O, a lever arranged to turn on a fulcrum, *m*, of an arm, *g*, which is fixed to the outside of chamber C; I, a link resting on the short arm P of lever O, and interposed between it and the center of diaphragm E, for the short arm P of lever O to press upwardly on the said diaphragm from the excess of leverage in the long arm Q, when loaded with a weight, H, which is adapted for adjustment on the long arm Q, for exerting a greater or lesser amount of leverage, through the lever O and link I, upwardly on the diaphragm E. The long arm Q of the lever O is graduated, as shown, so as to indicate with a known or given weight, H, the amount of leverage which is upwardly exerted on the diaphragm E when the weight is located at any point of the long arm Q of the lever. For example, suppose the given weight to be located at graduation ten; then ten is the number of pounds of upward leverage on every square inch of the diaphragm above the pressure of the atmosphere. The lever-fulcrum *m*, and also the bearings *n p* of the link I on the lever O, and the diaphragm E, are all knife-edge bearings, so called, and are so shown in the drawings, this class of bearings, as is well known, producing the least possible amount of friction, which, obviously, is desirable in apparatuses of this class.

The general operation of this regulator is substantially like ordinary steam-pressure regulators—that is, the steam at a high pressure passes through pipe A to the puppet-valve D, and from thence it passes through openings 1, making the valve-seats, to the steam-chamber C, wherein, by its action against the loaded diaphragm, combined with its action on said balanced valve and the action of said diaphragm, the said valve closes and opens from time to time, and thereby secures and maintains within the chamber C, for delivery at pipe B to the drying-cylinder, that reduced pressure of steam desired by the adjusted load on diaphragm E.

Besides the above in this regulator, as well as in other previous regulators, by locating the diaphragm at the lower part of the steam-chamber C, and interposing the connecting neck or pipe *f*, the diaphragm is protected against the direct action of the steam, because the space above said diaphragm, together with the said neck *f*, becomes, as it were, a reservoir for holding water produced from the condensation of steam or otherwise, and through this water the steam acts against the diaphragm E, and thus the diaphragm is protected. It may be also here observed that the water also acts as a counter-balance to the load on diaphragm.

Additional to the results above stated as common between this and other regulators, in the present improved regulator the following results are obtained: First, by the lever O and its described application to the diaphragm, together with the sliding or adjustably-disposed weight H, the apparatus is enabled to be most perfectly balanced before putting it into operation, and, furthermore, when in use it can be readily and accurately adjusted to any desired pressure, and, with a lever graduated as shown and described, it obviously will plainly indicate when the adjusted pressure is reached and exceeded in the apparatus; and, second, by the location of the guide 5 within the water well or neck *f*, substantially as has been described, while, as before stated, it steadies the movement of the lower part of the valve-stem, it also serves to prevent sudden concussions or thrusts of the valve, for the reason that it so attenuates or limits the communication between the diaphragm and the part of the well or neck *f* which is above it, and opens to the steam-chamber C, that, in the operation of the regulator, the movement of the water which, as described, lies on the diaphragm will be sufficiently retarded thereby to prevent any sudden change of steam-pressure from sensibly or practically jumping or thrusting the diaphragm, and thus the valve. The guide 5 offers no substantial interference with the desired operation of the regulator. By weighting the short arm of the lever O the parts of the regulator can be perfectly balanced independently of the pressure in steam-chamber C, and also by properly proportioning the weight of the poise H to that of the valve-stem *d* and its connections, and of the water on diaphragm, obviously it enables my regulator to be used for regulating pressure below that of the atmosphere when such may be desired.

The regulator herein described may be used for gas or other vapors, and also for fluids as well as steam, and, in cases where it is necessary, water may be filled in over the diaphragm through a suitable hole. (Not represented.)

Having thus described my invention, I shall state my claims, as follows:

1. The combination, in a pressure-regulator, of a flexible diaphragm, E, a balanced valve, D, and a lever, O, constructed and operating substantially as described.

2. A steam-pressure regulator consisting of a flexible diaphragm, E, a balanced valve, D, and a lever, O, combined with the guide 5 and stem *d* of the valve D, constructed and applied in the water-well *f*, substantially as described, and all for the purpose specified.

AUGUSTINE CAMPBELL.

Witnesses:
LEWIS CAMPBELL,
A. W. MARSHALL.